US005543197A

United States Patent [19]

Plaehn

[11] Patent Number: 5,543,197

[45] Date of Patent: Aug. 6, 1996

[54] PARALLEL RANDOMLY STACKED, STRANDED, LAMINATED BAMBOO BOARDS AND BEAMS

[76] Inventor: Jay Plaehn, 1765 Garnet Ave., San Diego, Calif. 92109

[21] Appl. No.: 198,553

[22] Filed: Feb. 18, 1994

[51] Int. Cl.$^{6}$ .............................. B32B 5/12; B32B 21/14

[52] U.S. Cl. ...................... 428/106; 428/107; 428/537.1; 144/333

[58] Field of Search ................................ 428/537.1, 106, 428/107; 144/332, 333

[56] References Cited

U.S. PATENT DOCUMENTS

| | | | |
|---|---|---|---|
| 3,723,230 | 3/1973 | Troutner | 156/580 |
| 4,061,819 | 12/1977 | Barnes | 428/294 |
| 4,146,123 | 3/1979 | Cottrell | 198/382 |
| 4,213,748 | 7/1980 | Ahrweiler | 425/371 |
| 4,232,067 | 11/1980 | Coleman | 428/17 |
| 4,255,477 | 3/1981 | Holman | 428/106 |
| 4,508,772 | 4/1985 | Churchland | 428/106 |
| 4,704,316 | 11/1987 | Green | 428/106 |
| 4,810,551 | 3/1989 | Chu | 428/106 |

OTHER PUBLICATIONS

Derwent WPI/Abstract #008549130, Chu(Inventor), GB2234935, 910220.

*Primary Examiner*—P. C. Sluby

*Attorney, Agent, or Firm*—Welsh & Katz, Ltd.

[57] ABSTRACT

A composite bamboo beam for use as a substitute for natural wood beams. Segments of bamboo stalk, either split or whole, are longitudinally aligned and randomly stacked. The bamboo segments are compressed and bonded together to form a cohesive bamboo composite structure from which beams of the desired dimension may be cut.

10 Claims, 1 Drawing Sheet

PARALLEL RANDOMLY STACKED, STRANDED, LAMINATED BAMBOO BOARDS AND BEAMS

The present invention relates to an artificial wood beam substitute, more specifically to the use of bamboo as a raw material to be used as the primary substance of the artificial wood, in which bamboo strands are laminated in random stacked parallel strips and are fused under pressure with adhesives added to create an artificial wood beam with qualities similar to that of naturally grown lumber.

BACKGROUND OF INVENTION

Wood beams are generally cut from naturally grown trees. However, trees are limited in supply due to the long time necessary for a tree to reach maturity. Also, the supply of natural wood is limited by the deforestation that is now occurring in many parts of the world.

One approach to this problem has been to resort to producing composite lumber formed out of wood products, lignocellulosic materials, or reconsolidated wood products, to make lumber products. Generally, producing composite lumber involves splitting, mashing, gluing, and manufacturing artificial wood from wood products to manufacture lumber products such as plywood, particle boards, and chip boards.

Additionally, U.S. Pat. No. 4,810,551 filed Mar. 7, 1989, shows a plywood made from sheets of bamboo comprised of strands of bamboo glued together side by side to make bamboo sheets of laminated strips where each sheet of bamboo runs perpendicular to the one below or above it, creating the conventional plywood cross grain layered design. It also claims a layered bamboo board made from sheets of bamboo stacked with the grain running in the same direction and glued together.

Therefore, there is a need for a natural wood beam substitute which is less expensive and at least as equally strong as natural wood beams. The beam must be composed of a material which is readily available and easily replenished, and which is not a threat to the environment.

SUMMARY OF INVENTION

Accordingly, it is an object of this invention is to produce a product that utilizes for strength and rigidity the exclusive use of bamboo.

It is another object to provide a beam which can be manufactured to virtually any dimension.

Finally, it is an object of this invention to provide a natural wood beam substitute which is less expensively produced but similar in appearance and superior in properties than natural wood beams.

In accordance with the present invention, all these objects, as well as others not herein specifically identified, are generally achieved by the present randomly stacked, stranded bamboo beam.

More specifically, the bamboo would be harvested, split open, and dried in long strips ranging from ¼ to ¾ inch in width to approximately 5 to 20 feet in length. The strands can be as short as 5 feet or less in small percentages. The dried strips would have adhesive applied evenly to them and they would be aligned in parallel fashion and stacked at random length and fused under pressure.

BRIEF DESCRIPTION OF THE DRAWINGS

Further objects of the invention, taken together with additional features contributing thereto and advantages occurring therefrom, will be apparent from the following description of the invention when read in conjunction with the accompanying drawings, wherein.

DETAILED DESCRIPTION OF THE INVENTION

Figure 1:
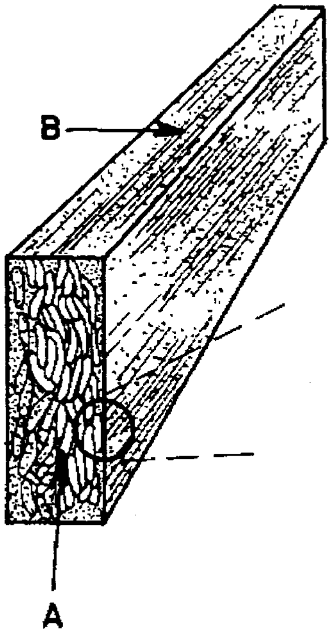
FIG. 1 is a front view of the composite bamboo beam.
Figure 2:
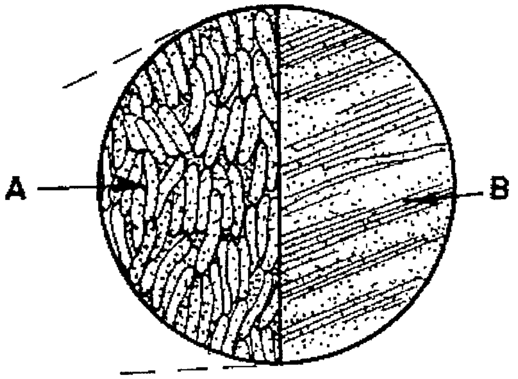
FIG. 2 is an exploded view of the corner of the composite bamboo beams to show more clearly the end grain and the flat surface of the beam which is consistent on all sides and ends of the composite bamboo beams.
Figure 3:
FIG. 3 is a side view of the composite bamboo beam.
Figure 4:
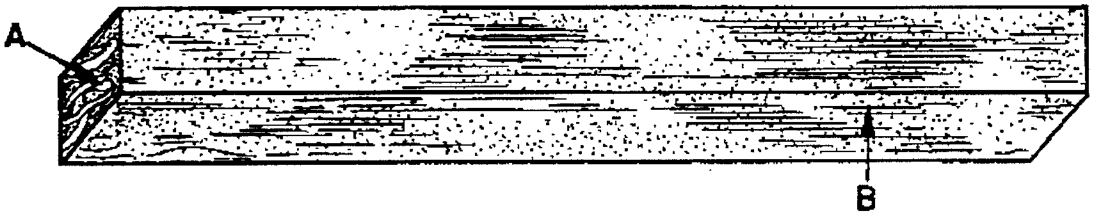
FIG. 4 is a top view of the composite bamboo beam.

Referring to FIG. 1, the bamboo beam is generally designated as 10 having a core 1 and an outer surface 2.

The core 1 consists of bamboo segments 3 which have been bonded and compressed together to form an adhesive structure. As shown in FIG. 1, the core 1 may contain gaps 6 due to the cross-sectional shape of the bamboo segments 3 and the randomness of the stacking of the segments 3.

The outer surface 2 is prepared by milling the adhesive structure to a desired dimension. In FIG. 1, the beam 10 is shown as having four side surfaces 4 and two end surfaces 5, defining the conventional beam dimension.

In the preferred embodiment, bamboo stalks are split open and dried in segments 3 ranging from ¼ to ¾ inch in width to approximately 5 to 20 feet in length. The segments 3 can be as short as 5 feet or less in small percentages. An adhesive suitable for bamboo is evenly applied to the dried segments 3 and the segments 3 are aligned in parallel fashion and stacked randomly. The stack is then fused under pressure until it results in a cohesive structure. When the stack has dried and is cohesive, it is milled into the desired beam dimensions.

It has been discovered that the resulting beams, regardless of variations in dimension, exhibit a uniform structural consistency which is highly desirable in lumber products. It was also discovered that the bamboo beam of this invention produced a beam which is lighter and oftentimes stronger than conventional construction grade lumber.

Additionally, suitable wood fillers 7 can be introduced into the stack before compression to eliminate any gaps 8 which may exist in the core 1 of the bamboo beam 10.

What is claimed is:

1. A bamboo beam comprising, in combination:

a plurality of bamboo segments, each of said bamboo segments having a length, width and a longitudinal axis, said longitudinal axes of said segments being generally parallel to one another, said segments having a random horizontal and vertical orientation about the length and width of each of said segments, respectively, said segments also having a random rotational orientation with regard to said longitudinal axis of each said segments, and said segments compressed and bonded together to form a single integral structure.

2. The bamboo beam of claim 1 further comprising wood fillers between said bamboo segments, wherein said wood fillers eliminate gaps within said bamboo beam created by said random horizontal, vertical and rotational orientation of said bamboo segments.

3. The bamboo beam of claim 1 wherein said bamboo segments have a width from ¼ to ¾ inches and a substantial number of said bamboo segments having a length from 5 to 20 feet.

4. The bamboo beam of claim 1 wherein said bamboo segments are longitudinal segments of whole bamboo stocks.

5. A bamboo beam comprising, in combination:

a plurality of bamboo segments, each of said bamboo segments having a length, width and a longitudinal axis, said longitudinal axes of said segments being generally parallel to one another, said segments having a random horizontal, vertical and rotational orientation with respect to each other, said bamboo segments having widths from ¼ to ¾ inches and a substantial number of said bamboo segments having lengths of from 5 to 20 feet, said bamboo segments compressed and bonded together to form a single integral structure; and wood fillers located between said bamboo segments, wherein said wood fillers eliminate gaps within said bamboo beam created by said random horizontal, vertical and rotational orientation of said bamboo beams.

6. The bamboo beam of claim 5 wherein said bamboo segments are longitudinal segments of whole bamboo stocks.

7. A bamboo beam having a length, width and height, said bamboo beam comprising, in combination:

a plurality of bamboo segments, each of said bamboo segments having a longitudinal axis, said axes being generally parallel with the length of the bamboo beam, and said segments otherwise randomly oriented with respect to each other about the width and height of the bamboo beam, said segments also randomly oriented rotationally about said longitudinal axis of each of said segments.

8. The bamboo beam of claim 7 further comprising wood fillers between said bamboo segments, wherein said wood fillers eliminate gaps within said bamboo beam.

9. The bamboo beam of claim 7 wherein said bamboo segments have a width from ¼ to ¾ inches and a substantial number of said segments having a length from 5 to 20 feet.

10. The bamboo beam of claim 7 wherein said bamboo segments are longitudinal segments of whole bamboo stocks.

* * * * *